D. Wineland.
Preventing Incrustation of Steam Boilers.
N° 89,366. Patented Apr. 27, 1869.
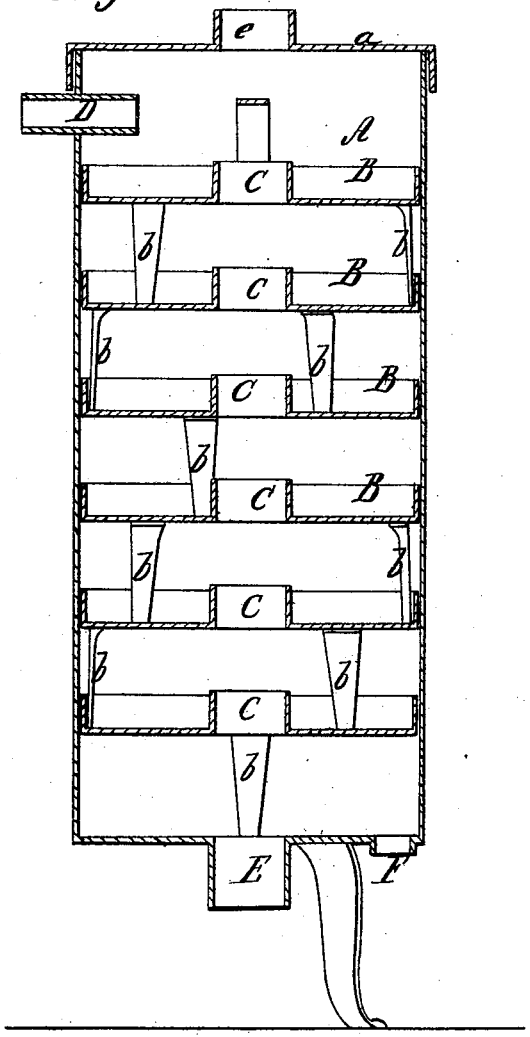
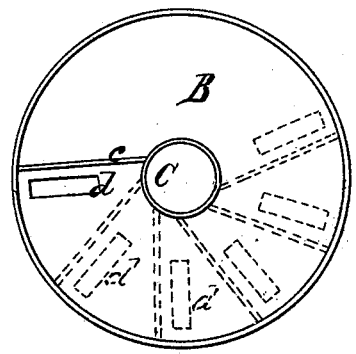
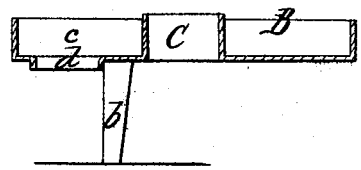
Witnesses,
Wm H Rowe
J. F. Olmstead
Inventor,
Daniel Wineland per
his att. G. B. Towle

United States Patent Office.

DANIEL WINELAND, OF McCOMB, OHIO.

Letters Patent No. 89,366, dated April 27, 1869.

IMPROVEMENT IN FEED-WATER FILTERING-HEATERS FOR BOILERS.

The Schedule referred to in these Letters Patent and making part of the same.

*To all whom it may concern:*

Be it known that I, DANIEL WINELAND, of McComb, in the county of Hancock, and State of Ohio, have invented a new and useful Improvement in Preventing the Incrustation of Steam-Boilers; and I do hereby declare that the following is a full, clear, and exact description of the construction and operation of the same, reference being had to the accompanying drawings, making a part of this specification, in which—

Figure 1 is a section of the apparatus or device.
Figure 2 is a top view in detail of cast-iron pan.
Figure 3 is a section of the pan.

Like letters in the figures of the drawings indicate like parts.

My invention consists in preventing the incrustation of steam-boilers with lime deposits from the water, by separating the lime from the water before it enters the boiler, by means of a series of pans, being provided in a suitable manner with partitions and slots, and tubes inverted centrally from the bottoms thereof, said pans being so combined and arranged with each other in a cylindrical vessel, connecting properly with the boiler, as that by introducing the water from the top of the vessel into the pan, and the steam at the bottom of the vessel, the lime will be separated from the water, and deposited in the pans by the steam passing up through the centre of and under each pan, and heating the water while it is passing from pan to pan through the slots thereof to the boiler.

To enable any one skilled in the art to make and use my invention, I will proceed to describe its construction and operation.

A is the cylindrical vessel, having a tight-fitting cover, *a*, which may be screwed on, or secured to the top of the vessel, by flanges and bolts.

B are the pans, which will be made of cast-iron, and provided with legs *b*.

Each pan will have a short tube, C, inverted centrally from the bottom thereof, and a partition, *c*, properly attached or cast therewith, between the tube and the sides of the pan, and also have an elongated slot, *d*, in the corner next to the sides of the pan.

D is a tube for the admission of the water to the vessel, which tube is properly fixed in the side near the top of the same.

E is a tube for the admission of the steam to the vessel, which tube is attached centrally to the bottom thereof.

The cover *a* is provided with an outlet, *e*, for the escape of the steam.

The pans are arranged in the vessel, the one upon the top of the other, (see fig. 1,) with their slots in such a manner as that they will not come immediately over one another, but in such a way as to let the water pass around first in the pan, and thence through the slot thereof, to the pan below, and in like manner around in it through its slot, to the next pan, and so on, until the water reaches the bottom of the vessel, whence it is discharged at F into the boiler.

The water being let into the top pan through the tube D, which tube is so arranged with regard to the top pan as that the tube will not come immediately over the slot thereof, but a little to one side of the partition, and thus let the water pass around in the pan to the slot, as above described.

The steam being admitted through the tube E, passes up through the centre of and under each pan, and heating the water, separates the lime therefrom, during its passage through the pans to the boiler, whence the lime is deposited, or left in the pans, and the water thus purified before entering the boiler.

Having thus fully described my invention,
What I claim therein as new, and desire to secure by Letters Patent, is—

1. The pans B, provided with partitions *c*, slots *d*, and inverted tubes C, substantially as specified.

2. The arrangement of the pans B with reference to the vessel A, water-inlet D, and outlet E, and a steam-inlet, E, and outlet *e*, substantially as herein set forth.

DANIEL WINELAND.

Witnesses:
JACOB F. BURKETT,
E. C. BETTS.